United States Patent
Nakata

(10) Patent No.: US 10,339,395 B2
(45) Date of Patent: Jul. 2, 2019

(54) DISPLAY DEVICE, VEHICLE CONTROLLER, TRANSMITTER, AND TRAVELLING ASSISTANCE SYSTEM

(71) Applicant: DENSO CORPORATION, Kariya, Aichi-pref. (JP)

(72) Inventor: Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 144 days.

(21) Appl. No.: 15/183,835

(22) Filed: Jun. 16, 2016

(65) Prior Publication Data

US 2017/0004366 A1    Jan. 5, 2017

(30) Foreign Application Priority Data

Jun. 30, 2015 (JP) ................................. 2015-131316

(51) Int. Cl.
| | | |
|---|---|---|
| *G06K 9/00* | (2006.01) | |
| *G06T 11/00* | (2006.01) | |
| *B60Q 9/00* | (2006.01) | |

(52) U.S. Cl.
CPC ......... *G06K 9/00805* (2013.01); *B60Q 9/008* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 2012/0242505 A1 | 9/2012 | Maeda et al. | |
| 2013/0131922 A1* | 5/2013 | Ogata | B60Q 1/143 701/36 |
| 2014/0118551 A1* | 5/2014 | Ikeda | B60R 1/00 348/148 |

FOREIGN PATENT DOCUMENTS

| | | |
|---|---|---|
| JP | 2009-134704 A | 6/2009 |
| WO | WO-2011114366 A1 | 9/2011 |

* cited by examiner

*Primary Examiner* — Wei Wen Yang
(74) *Attorney, Agent, or Firm* — Harness, Dickey & Pierce, P.L.C.

(57) ABSTRACT

A display device includes: an information acquisition unit communicating with an outside to acquire absence region information identifying an absence region in which an obstacle is presumed to be absent; and a display unit displaying the absence region, which is acquired by the information acquisition unit, in a state of superimposing the absence region on a map. A vehicle controller includes: an information acquisition unit communicating with an outside to acquire absence region information identifying an absence region in which an obstacle is presumed to be absent; and a vehicle control unit performing vehicle control based on the absence region. A transmitter includes: a sensor detecting an obstacle; an information creation unit creating absence region information identifying an absence region based on a result detected by the sensor; and a transmission unit transmitting the absence region information. In addition, a travelling assistance system includes the display device and the transmitter.

16 Claims, 10 Drawing Sheets

DISPLAY DEVICE, VEHICLE CONTROLLER, TRANSMITTER, AND TRAVELLING ASSISTANCE SYSTEM

CROSS REFERENCE TO RELATED APPLICATIONS

This application is based on Japanese Patent Application No. 2015-131316 filed on Jun. 30, 2015, the disclosure of which is incorporated herein by reference.

TECHNICAL FIELD

The present disclosure relates to a display device, a vehicle controller, a transmitter, and a travelling assistance system.

BACKGROUND

There is known a technique which aims to perform more appropriate vehicle control by exchanging information obtained by monitoring the surroundings of a vehicle with another vehicle (refer to Patent Literature 1). The technique disclosed in Patent Literature 1 analyzes a state of a subject vehicle detected by the other vehicle and reflects the analysis result in vehicle control of the subject vehicle.

The technique disclosed in Patent Literature 1 is aimed at preventing an accident between the subject vehicle and the other vehicle with which the subject vehicle can communicate, but cannot prevent an accident with an obstacle (such as another vehicle without means of communication and a pedestrian) other than the other vehicle with which the subject vehicle can communicate.

[Patent Literature 1] JP-2009-134704-A

SUMMARY

It is an object of the present disclosure to provide a display device, a vehicle controller, a transmitter, and a travelling assistance system capable of preventing an accident with an obstacle besides another vehicle with which a subject vehicle can communicate.

A display device according to a first aspect of the present disclosure includes: an information acquisition unit that communicates with an outside to acquire absence region information identifying an absence region in which an obstacle is presumed to be absent; and a display unit that displays the absence region, which is acquired by the information acquisition unit, in a state of superimposing the absence region on a map.

A vehicle controller according to a second aspect of the present disclosure includes: an information acquisition unit that communicates with an outside to acquire absence region information identifying an absence region in which an obstacle is presumed to be absent; and a vehicle control unit that performs vehicle control based on the absence region acquired by the information acquisition unit.

A transmitter according to a third aspect of the present disclosure includes: a sensor that detects an obstacle; an information creation unit that creates absence region information identifying an absence region in which the obstacle is presumed to be absent based on a result detected by the sensor; and a transmission unit that transmits the absence region information.

A travelling assistance system according to a fourth aspect of the present disclosure includes: the display device according to the first aspect of the present disclosure; and the transmitter according to the third aspect of the present disclosure.

Accordingly, a driver of a vehicle equipped with the display device sees the display to realize that an obstacle is present outside the absence region. Hence, the display device and the vehicle controller achieve the above-mentioned advantageous effect by using the absence region information transmitted by the transmitter. Additionally, the travelling assistance system configured by the display device and the transmitter also achieves the above-mentioned advantageous effect.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described with reference to the drawings.

(First Embodiment)

1. Configuration of Travelling Assistance System 1

Figure 1:
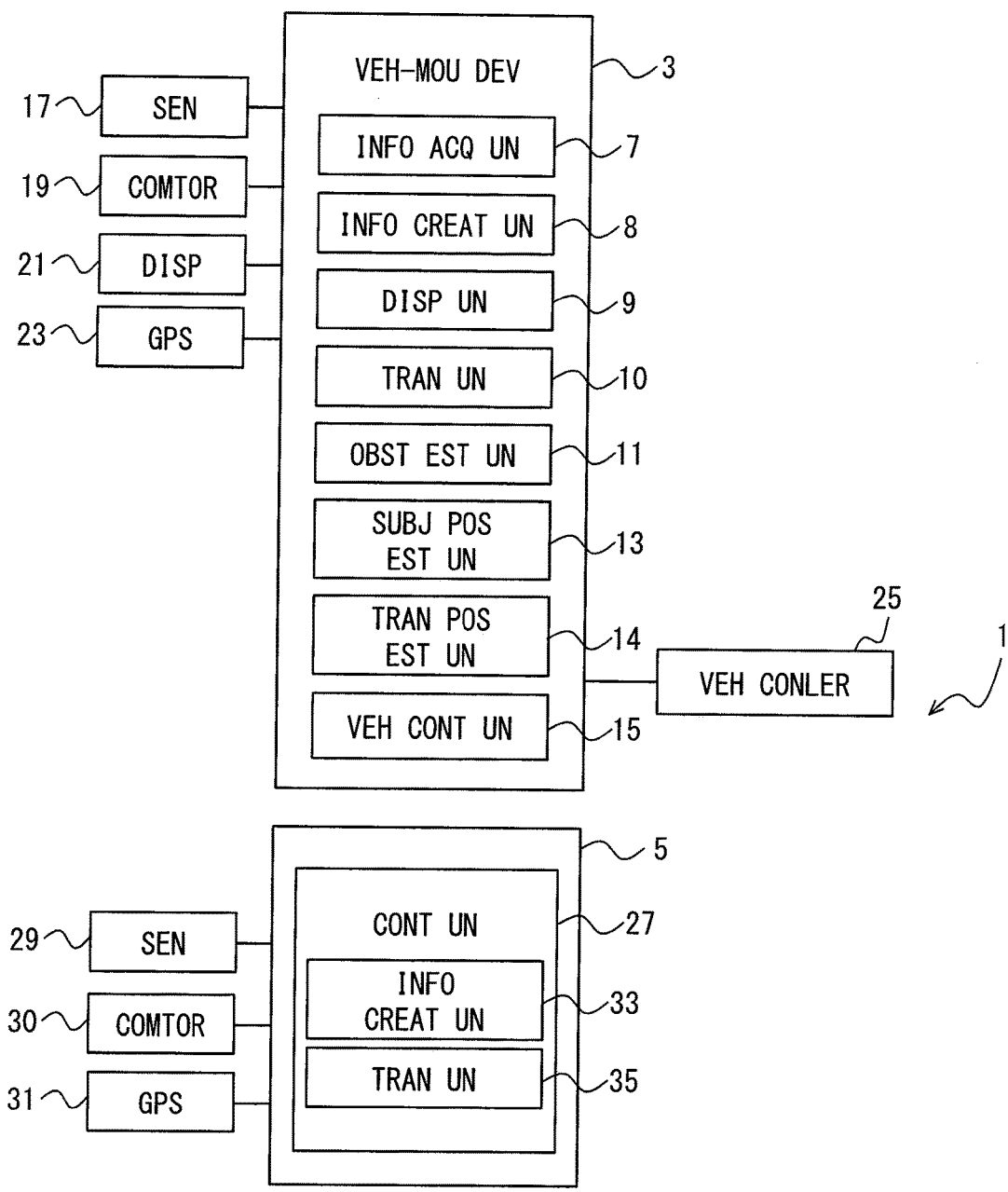
FIG. 1 is a block diagram illustrating a configuration of a travelling assistance system.
Figure 2:
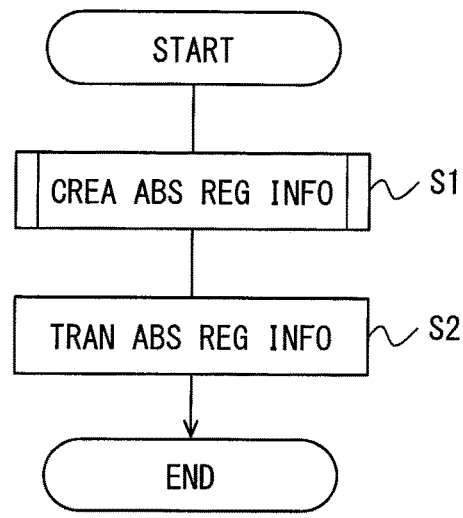
FIG. 2 is a flowchart illustrating processing executed by a transmitter.
Figure 3:
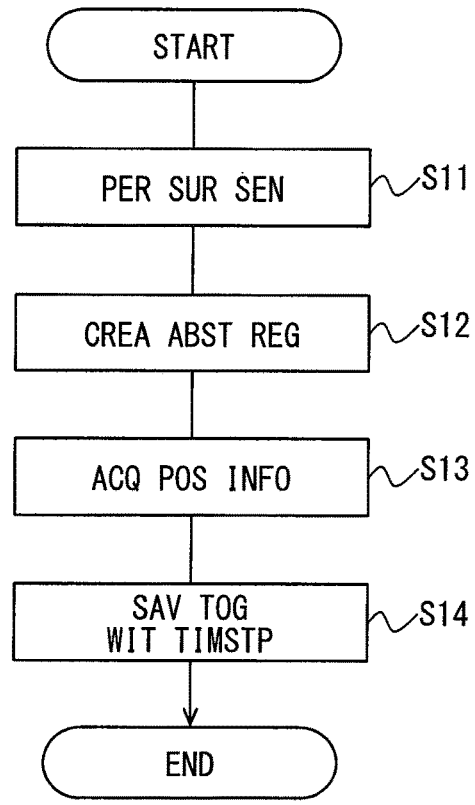
FIG. 3 is a flowchart illustrating absence region information creation processing executed by the transmitter.

A configuration of a travelling assistance system 1 will be described with reference to FIG. 1. The travelling assistance system 1 includes a vehicle-mounted device 3 and a transmitter 5. The travelling assistance system 1 may include one vehicle-mounted device 3 or a plurality of vehicle-mounted devices 3. Likewise, the travelling assistance system 1 may include one transmitter 5 or a plurality of transmitters 5.

The vehicle-mounted device 3 is mounted on a vehicle. The vehicle equipped with the vehicle-mounted device 3 will be hereinafter referred to as a subject vehicle. The vehicle-mounted device 3 is a known computer including a CPU, a RAM, a ROM, and the like, and executes processing to be described below by a program stored in the ROM.

The vehicle-mounted device 3 functionally includes an information acquisition unit 7, an information creation unit 8, a display unit 9, a transmission unit 10, an obstacle estimation unit 11, a subject position estimation unit 13, a transmitter position estimation unit 14, and a vehicle control unit 15. A function of each unit will be described later.

In addition to the vehicle-mounted device 3, the subject vehicle includes a sensor 17, a communicator 19, a display 21, a GPS 23, and a vehicle controller 25. The sensor 17 is a known sensor capable of detecting an obstacle (such as another vehicle, a pedestrian, a stationary object such as a wall). Examples of the sensor 17 may include a millimeter wave sensor, a camera, a laser radar, an ultrasonic sensor, and the like.

The communicator 19 can perform wireless communication with a vehicle-mounted device 3 mounted on a vehicle other than the subject vehicle (such device will be hereinafter referred to as another vehicle-mounted device 3) and the transmitter 5. The display 21 is a display installed in the interior of the subject vehicle and capable of displaying an arbitrary image. The GPS 23 acquires position information of the subject vehicle (that is, position information of the vehicle-mounted device 3). The vehicle controller 25 performs vehicle control according to a signal from the vehicle-mounted device 3. The vehicle control includes automatic braking and automatic steering.

The transmitter 5 may be mounted on a vehicle other than the subject vehicle or installed on the roadside. The transmitter 5 includes a control unit 27, a sensor 29, a communicator 30 and a GPS 31. The control unit 27 is a known computer including a CPU, a RAM, a ROM, and the like, and executes processing to be described below by a program stored in the ROM. The control unit 27 functionally includes an information creation unit 33 and a transmission unit 35. A function of each unit will be described later.

The sensor 29 is similar to the aforementioned sensor 17. The communicator 30 can perform wireless communication with the vehicle-mounted device 3. The GPS 31 acquires position information of the transmitter 5. Note that the vehicle-mounted device 3 is an example of the display device and the vehicle controller. The transmitter 5 is an example of an outside of the vehicle-mounted device 3.

2. Processing Executed by Transmitter 5

The processing repeated by the transmitter 5 every predetermined time will be described with reference to FIGS. 2, 3, 4A and 4B. According to FIG. 2, the information creation unit 33 creates absence region information in step S1. The processing will be specifically described with reference to FIG. 3. In step S11, the information creation unit 33 uses the sensor 29 to perform sensing on the surroundings of the transmitter 5. The sensor 29 can detect an obstacle within a detection range 37 illustrated in FIG. 4A. The detection range 37 is fan-shaped with the sensor 29 being a pivot.

In step S12, the information creation unit 33 determines an absence region on the basis of the result of surroundings sensing performed in step S11. The absence region refers to a region in which an obstacle is presumed to be absent. The absence region is determined as follows.

Figure 4A:
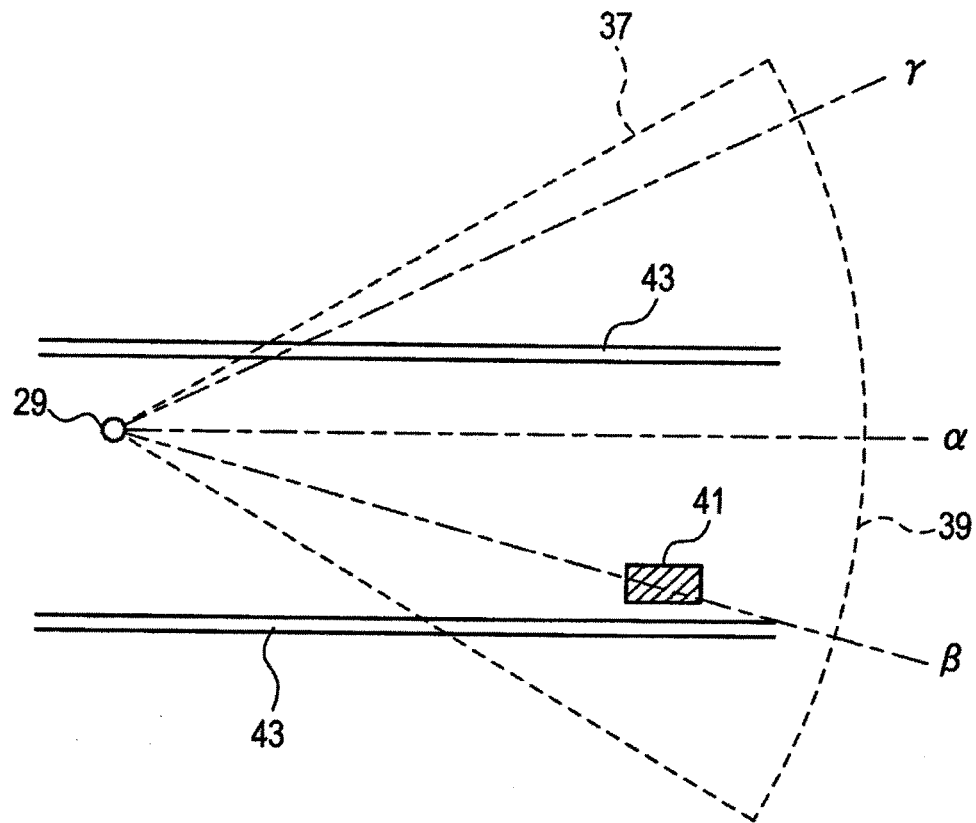
FIGS. 4A and 4B are diagrams illustrating a method of determining an absence region (FIG. 4A) and an example of an absence region (FIG. 4B)

When the sensor 29 does not detect an obstacle in a direction a illustrated in FIG. 4A, for example, a point along the direction a from the sensor 29 up to a detection limit line 39 of the detection range 37 is included in the absence region.

When the sensor 29 detects an obstacle (vehicle 41) in a direction β, a point between the sensor 29 and the vehicle 41 among points along the direction β is included in the absence region. A point at the vehicle 41 and farther therefrom as seen from the sensor 29 is not included in the absence region.

When the sensor 29 detects an obstacle (wall 43) in a direction γ, a point between the sensor 29 and the wall 43 among points along the direction γ is included in the absence region. A point at the wall 43 and farther therefrom as seen from the sensor 29 is not included in the absence region.

Figure 4B:
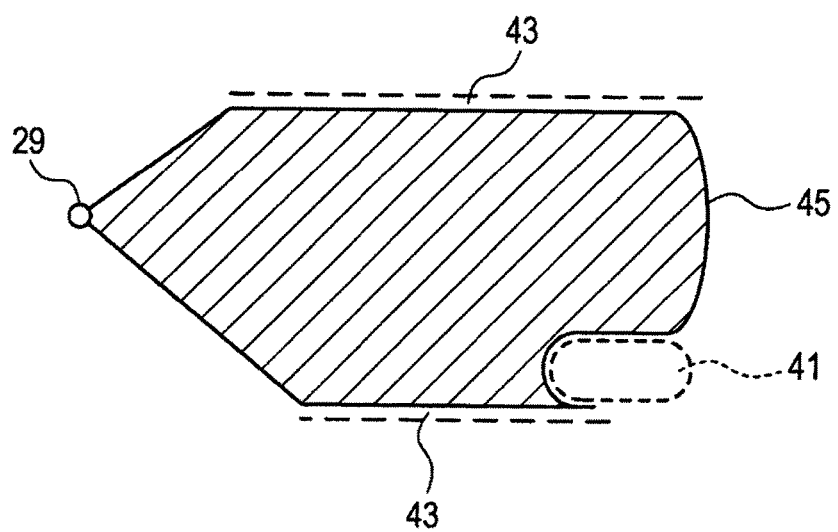

When the sensor 29 detects a road surface at an arbitrary point within the detection range 37, the point is included in the absence region. The information creation unit 33 determines whether each point within the detection range 37 is included in the absence region as described above. Then, a set of points determined to be included in the absence region is determined as the absence region. FIG. 4B illustrates an example of an absence region 45. The absence region 45 is a region expressed in coordinates relative to the position of the sensor 29 (that is, the position of the transmitter 5).

Referring back to FIG. 3, in step S13, the information creation unit 33 uses the GPS 31 to acquire the position information of the transmitter 5. The position information is absolute position information with reference to the Earth. In step S14, the information creation unit 33 creates and saves information (hereinafter referred to as absence region information) including the absence region created in step S12, the position information acquired in step S13, and a timestamp. The timestamp is a piece of information indicating the time at which the sensing is performed in step S11.

Referring back to FIG. 2, in step S2, the transmission unit 35 uses the communicator 30 to transmit the absence region information created in step S1.

3. First Processing Executed by Vehicle-mounted Device 3

Figure 6:
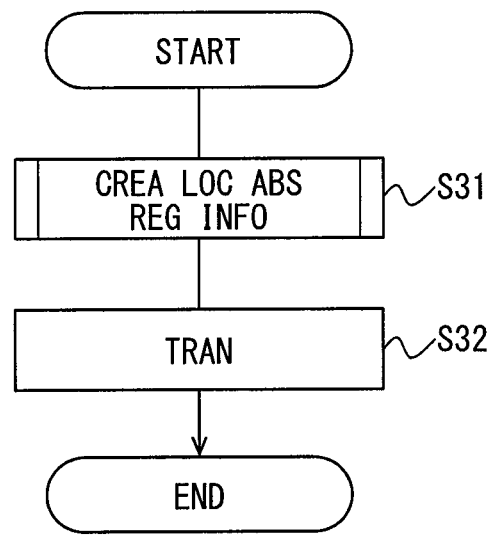
FIG. 6 is a flowchart illustrating local absence region information creation/transmission processing executed by the vehicle-mounted device.
Figure 7:
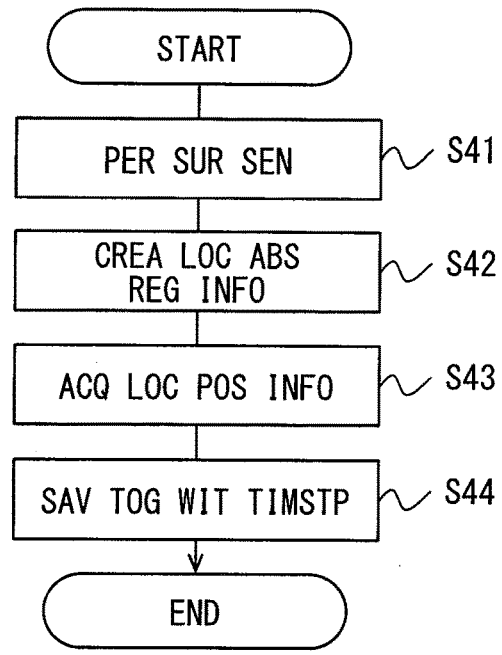
FIG. 7 is a flowchart illustrating local absence region information creation processing executed by the vehicle-mounted device.
Figure 8:
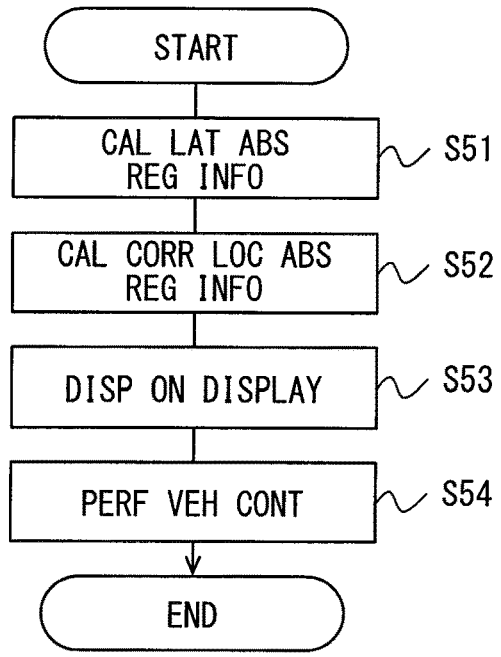
FIG. 8 is a flowchart illustrating absence region display processing executed by the vehicle-mounted device.
Figure 9:
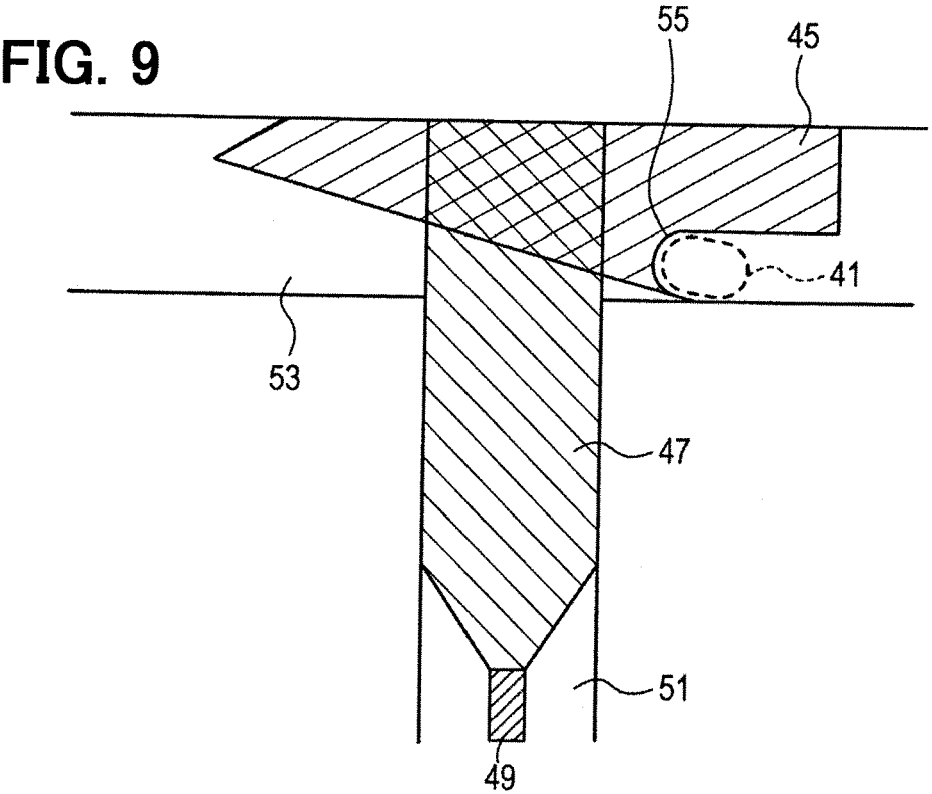
FIG. 9 is a diagram illustrating a display example of the absence region and a local absence region.

First processing executed by the vehicle-mounted device 3 will be described with reference to FIGS. 5 to 9. The first processing includes processing of acquiring absence region information as illustrated in FIG. 5, processing of creating local absence region information as illustrated in FIGS. 6 and 7, and processing of displaying an absence region as illustrated in FIGS. 8 and 9.

(3-1) Processing of Acquiring Absence Region Information

Figure 5:
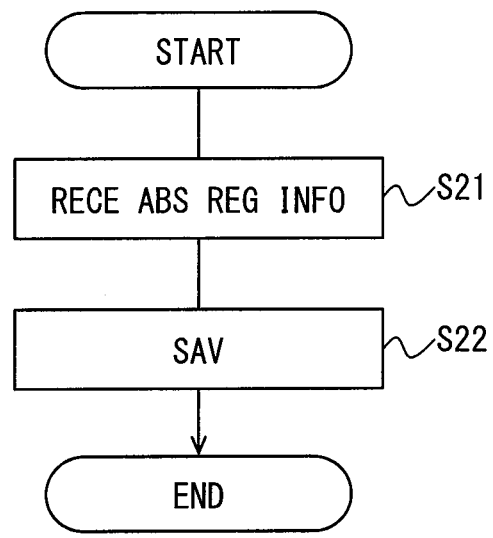
FIG. 5 is a flowchart illustrating absence region information acquisition processing executed by a vehicle-mounted device.

The vehicle-mounted device 3 repeats the processing of acquiring absence region information in FIG. 5 every predetermined time. In step S21, the information acquisition unit 7 uses the communicator 19 to acquire absence region information. Note that the absence region information is the absence region information transmitted by the transmitter 5 in step S2 or local absence region information transmitted by another vehicle-mounted device 3 in step S32 to be described later. The local absence region information transmitted by the other vehicle-mounted device 3 serves as the absence region information in the vehicle-mounted device 3 receiving the information.

In step S22, the information acquisition unit 7 saves the absence region information acquired in step S21.

(3-2) Processing of Creating and Transmitting Local Absence Region Information

The vehicle-mounted device 3 repeats the processing of creating and transmitting local absence region information in FIGS. 6 and 7 every predetermined time.

In step S31, the information creation unit 8 creates the local absence region information. The processing will be specifically described with reference to FIG. 7. In step S41, the information creation unit 8 uses the sensor 17 to perform sensing on the surroundings of the subject vehicle. Note that the sensor 17 has a detection range 37 similar to that of the sensor 29 (see FIG. 4A).

In step S42, the information creation unit 8 determines a local absence region on the basis of a result of the surroundings sensing performed in step S41. The local absence region is determined by a method similar to the method by which the transmitter 5 determines the absence region.

In step S43, the information creation unit 8 uses the GPS 23 to acquire position information of the subject vehicle (such information will be hereinafter referred to as local position information). The local position information is absolute position information with reference to the Earth.

In step S44, the information creation unit 8 creates and saves information (hereinafter referred to as local absence region information) including the local absence region created in step S42, the local position information acquired in step S43, and a local timestamp. The local timestamp is a piece of information indicating the time at which the sensing is performed in step S41.

Referring back to FIG. 6, in step S32, the transmission unit 10 uses the communicator 19 to transmit the local absence region information created in step S31.

(3-3) Processing of Displaying Absence Region

The vehicle-mounted device 3 repeats the processing of displaying an absence region in FIGS. 8 and 9 every predetermined time.

In step S51, the display unit 9 calls absence region information of the latest time indicated by the timestamp, from among the absence region information saved in step S22.

In step S52, the display unit 9 calls all local absence region information corresponding to the absence region information called in step S51, from among the local absence region information saved in step S44. Here, the local absence region information corresponds to the absence region information when a difference between the time indicated by the timestamp of the absence region information and the time indicated by the local timestamp of the local absence region information is equal to or less than a preset threshold.

In step S53, the display unit 9 uses the display 21 to display the absence region 45 with the absence region 45 superimposed on a map as illustrated in FIG. 9, the absence region being included in the absence region information called in step S51. The absence region information includes the position information of the transmitter 5 as well as the absence region 45. The absence region 45 is expressed in the coordinates relative to the position of the transmitter 5 as described above. The position information of the transmitter 5 can be used to express the absence region 45 in absolute coordinates and to superimpose the absence region 45 on the map.

Moreover, in step S53, the display unit 9 uses the display 21 to display a local absence region 47 with the local absence region 47 superimposed on the map as illustrated in FIG. 9, the local absence region being included in the local absence region information called in step S52. Note that FIG. 9 illustrates a subject vehicle 49 and roads 51 and 53.

In step S54, the vehicle control unit 15 performs vehicle control on the basis of the absence region 45 and the local absence region 47. The vehicle control is performed as follows, for example. The vehicle control unit 15 analyzes the shape of each of the absence region 45 and the local absence region 47 to search for an area where an obstacle is presumably present. In the example illustrated in FIG. 9, a concave portion 55 in the absence region 45 corresponds to the area where a vehicle 41 (an example of the obstacle) is presumably present.

When the presence of the obstacle is presumed, the vehicle control unit 15 determines the possibility of a collision on the basis of a distance between the obstacle and the subject vehicle 49, traveling directions of the two, and the like. When determining that the collision is highly likely to occur, the vehicle control unit 15 uses the vehicle controller 25 to perform vehicle control that can reduce the risk of the collision. Such vehicle control includes automatic braking, automatic steering, and the like.

4. Second Processing Executed by Vehicle-mounted Device 3

Figure 10:
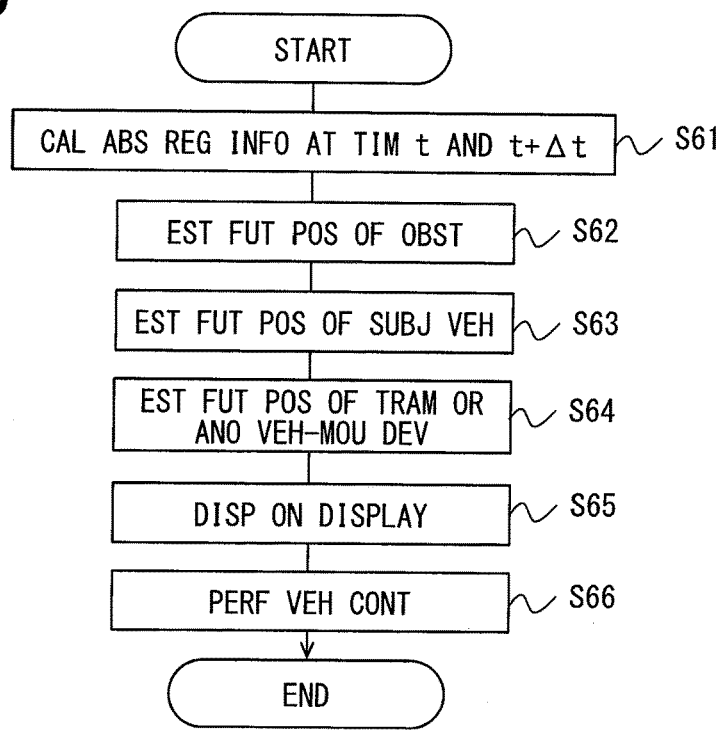
FIG. 10 is a flowchart illustrating second processing executed by the vehicle-mounted device.
Figure 11A:
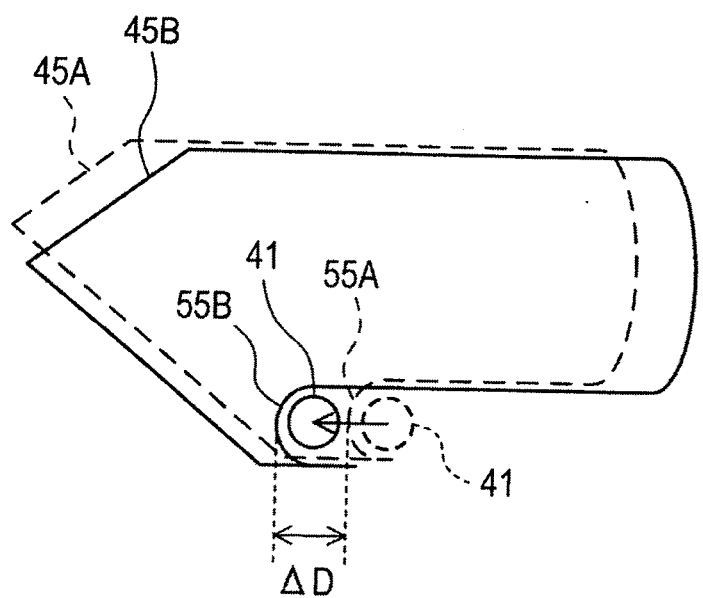
FIGS. 11A and 11B are diagrams each illustrating an example of processing that estimates a future position of an obstacle.
Figure 11B:
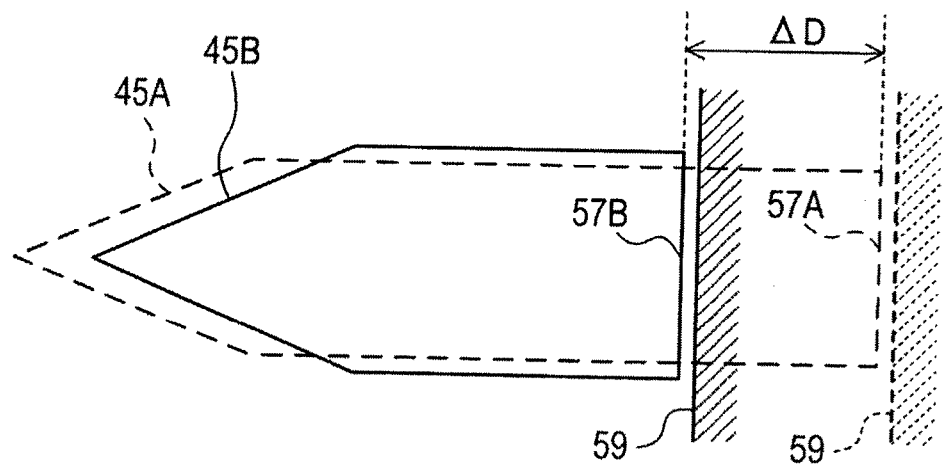
Figure 12:
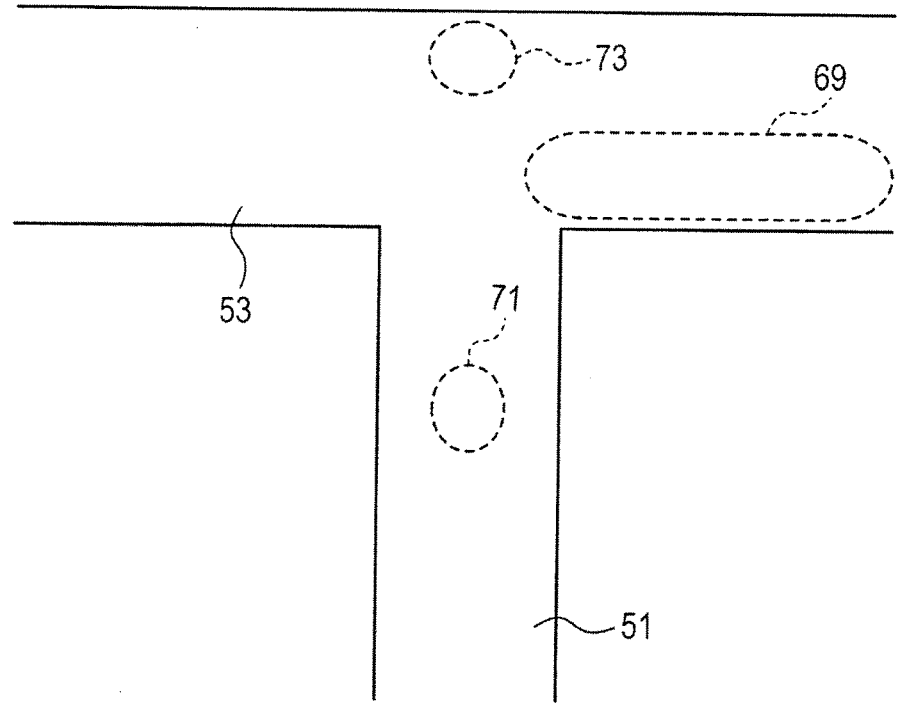
FIG. 12 is a diagram illustrating a display example of a future position of an obstacle, a future position of a subject vehicle, and a future position of the transmitter or another vehicle-mounted device.

Second processing that is repeated every predetermined time by the vehicle-mounted device 3 will be described with reference to FIGS. 10 to 12. In step S61 of the flowchart in FIG. 10, the obstacle estimation unit 11 calls absence region information at time t indicated by the timestamp and absence region information at time (t+Δt) indicated by the timestamp, from among the absence region information saved in step S22. Here, Δt is a positive number.

In step S62, the obstacle estimation unit 11 estimates a future position of an obstacle by using the shape of the absence region and a change in the shape of the absence region included in the absence region information called in step S61.

Processing of estimating the future position of the obstacle will be described with reference to an example illustrated in FIG. 11A. FIG. 11A illustrates an absence region 45A when the time t is indicated by the timestamp and an absence region 45B when the time (t+Δt) is indicated by the timestamp. Each of the absence regions 45A and 45B in FIG. 11A is expressed in absolute coordinates.

The absence regions 45A and 45B include concave portions 55A and 55B, respectively, where the concave portion 55B is shifted to the left in FIG. 11A relative to the concave portion 55A by a distance ΔD. It can be estimated from the shape and change in the shape of each of the absence regions 45A and 45B that the vehicle 41 present at the concave portions 55A and 55B travels to the left in FIG. 11A by the distance ΔD during the time Δt.

The obstacle estimation unit 11 estimates the position of the vehicle 41 at time (t+nΔt) while assuming the traveling speed and direction of the vehicle 41 do not change. Here, n is a natural number of two or more, and the time (t+nΔt) is an example of time in the future.

Another processing of estimating the future position of the obstacle will be described with reference to an example illustrated in FIG. 11B. FIG. 11B illustrates an absence region 45A when the time t is indicated by the timestamp and an absence region 45B when the time (t+Δt) is indicated by the timestamp.

Each of the absence regions 45A and 45B in FIG. 11B is expressed in absolute coordinates.

The absence regions 45A and 45B include straight limit lines 57A and 57B, respectively. The limit line is a line separating the absence region from an outside region. The limit line 57B is shifted to the left in FIG. 11B relative to the limit line 57A by a distance ΔD. The distance ΔD is larger than the amount of shift of another part in the absence region.

It can be estimated from the shape and change in the shape of each of the absence regions 45A and 45B that a large obstacle 59 present outside the limit lines 57A and 57B travels to the left in FIG. 11B by the distance ΔD during time Δt.

The obstacle estimation unit 11 estimates the position of the obstacle 59 at time (t+nΔt) while assuming the traveling speed and direction of the obstacle 59 do not change. Here, n is a natural number of two or more, and the time (t+nΔt) is an example of time in the future.

Referring back to FIG. 10, in step S63, the subject position estimation unit 13 estimates a future position of the subject vehicle. The future position of the subject vehicle can be estimated while assuming the speed and a direction of travel of the subject vehicle remain constant. Here, the future in "the future position of the subject vehicle" refers to the same time in the future as that when the future position of the obstacle is estimated in step S62, or a timing at which a time difference between the two is equal to or less than a threshold.

In step S64, the transmitter position estimation unit 14 estimates as follows a future position of the transmitter 5 or another vehicle-mounted device 3 (hereinafter referred to as the transmitter 5 or the like) from which the absence region information is transmitted.

The transmitter position estimation unit 14 first acquires position information of the transmitter 5 or the like at the times t and (t+Δt) from the absence region information at the time t indicated by the timestamp and the absence region information at the time (t+Δt) indicated by the timestamp, the absence region information being called in step S61.

Then, the position of the transmitter 5 or the like at the time (t+nΔt) is estimated while assuming the speed and a direction of travel of the transmitter 5 or the like remain constant. In step S65, the display unit 9 uses the display 21 to display a future position 69 of the obstacle estimated in step S62, a future position 71 of the subject vehicle estimated in step S63, and a future position 73 of the transmitter 5 or the like estimated in step S64 with these positions superimposed on a map as illustrated in FIG. 12.

In step S66, the vehicle control unit 15 performs vehicle control on the basis of the future position 69 of the obstacle, the future position 71 of the subject vehicle, and the future position 73 of the transmitter 5 or the like. Specifically, the vehicle control unit 15 performs vehicle control such as automatic braking or automatic steering by using the vehicle controller 25 when a distance between the future position 69 of the obstacle and the future position 71 of the subject vehicle is equal to or less than a predetermined threshold.

Likewise, the vehicle control unit 15 performs vehicle control such as automatic braking or automatic steering by using the vehicle controller 25 when a distance between the future position 73 of the transmitter 5 or the like and the future position 71 of the subject vehicle is equal to or less than a predetermined threshold.

5. Advantageous Effects Achieved by Vehicle-mounted Device 3 and Travelling Assistance System 1

(1A) The vehicle-mounted device 3 can acquire the absence region information and display the absence region superimposed on the map. A driver of the subject vehicle sees the display to be able to realize that an obstacle can be present outside the absence region. Safety of the subject vehicle is thus improved.

(1B) The vehicle-mounted device 3 acquires the absence region information to be able to perform vehicle control on the basis of the absence region. Safety of the subject vehicle is thus improved.

(1C) The vehicle-mounted device 3 estimates each of the future position of the obstacle, the future position of the subject vehicle, and the future position of the transmitter 5 or the like to be able to display the estimated result on the display 21 with the estimated result superimposed on the map. As a result, the driver of the subject vehicle can easily avoid approaching and coming into contact with the obstacle, the transmitter 5 and another vehicle equipped with the other vehicle-mounted device 3.

(1D) The vehicle-mounted device 3 estimates each of the future position of the obstacle, the future position of the subject vehicle, and the future position of the transmitter 5 or the like to perform vehicle control by using the estimated result. The vehicle control can thus be performed appropriately.

(1E) The transmitter 5 creates and transmits the absence region information. The vehicle-mounted device 3 uses the absence region information to be able to achieve the aforementioned advantageous effects (1A) to (1D).

(Second Embodiment)

1. Difference between First and Second Embodiments

A second embodiment has a basic configuration similar to that of the first embodiment. Therefore, a difference of the second embodiment from the first embodiment will be mainly described, and the description of a common configuration is omitted.

Figure 13:
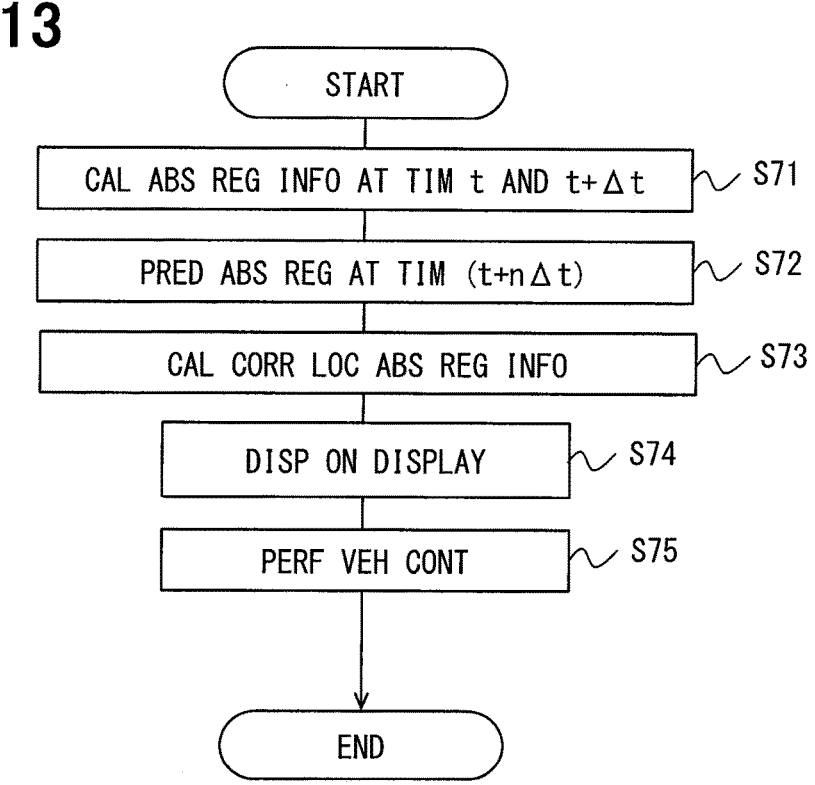
FIG. 13 is a flowchart illustrating absence region display processing executed by the vehicle-mounted device.

A vehicle-mounted device 3 performs processing illustrated in FIG. 13 as processing of displaying an absence region. In step S71, a display unit 9 calls absence region information at time t indicated by a timestamp and absence region information at time (t+Δt) indicated by a timestamp, from among the absence region information saved in step S22. Here, Δt is a positive number.

In step S72, the display unit 9 predicts an absence region at a time point after the time point at which the absence region information is created, on the basis of the position of the absence region changing as time elapses. The processing will be described with reference to an example illustrated in FIG. 14.

Figure 14:
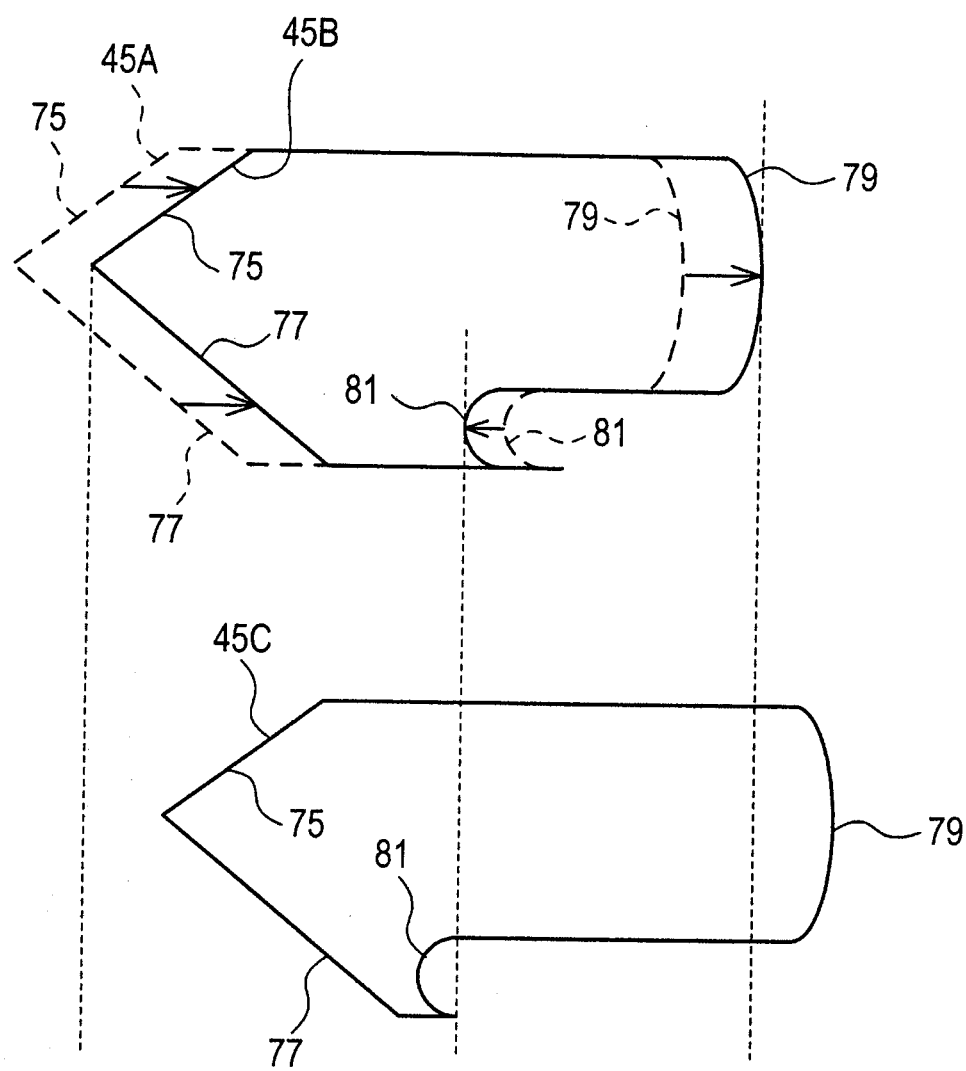
FIG. 14 is a diagram illustrating processing that predicts an absence region at a time point after a time point at which the absence region information is created.

FIG. 14 illustrates an absence region 45A when time t is indicated by the timestamp and an absence region 45B when time (t+Δt) is indicated by the timestamp. Each of the absence regions 45A and 45B in FIG. 14 is expressed in absolute coordinates.

Sections 75, 77, and 79 of a limit line of each of the absence regions 45A and 45B shift to the right in FIG. 14 as time elapses. A section 81 shifts to the left in FIG. 14 as time elapses. Note that the section refers to one unit of a plurality into which the limit line is divided.

The display unit 9 predicts the position of each section at time (t+mΔt) while assuming the traveling speed and direction of each section do not change. Then, a region enclosed in a limit line formed by connecting each section predicted is determined as an absence region 45C at the time (t+mΔt).

Here, m is a natural number of two or more. The time (t+mΔt) is time which comes after the time t and time (t+Δt) and at which displaying is performed in step S74 to be described later. In step S73, the display unit 9 calls all local absence region information corresponding to the absence region 45C predicted in step S72, from among the local absence region information saved in step S44. A local timestamp indicates time closest to the time (t+mΔt) in the corresponding local absence region information.

In step S74, the display unit 9 uses the display 21 to display the absence region 45C predicted in step S72 and a local absence region included in the local absence region information called in step S73 with these regions superimposed on a map.

In step S75, a vehicle control unit 15 performs vehicle control on the basis of the absence region 45C and the local absence region. The vehicle control is performed in a manner similar to that according to the first embodiment. Note that in the present embodiment, the display unit 9 is an example of a display unit and a prediction unit.

2. Advantageous Effects Achieved by Vehicle-mounted Device 3 and Travelling Assistance System 1

According to the second embodiment described above in detail, the following advantageous effects can be achieved in addition to the advantageous effects (1A) to (1E) of the first embodiment.

(2A) The vehicle-mounted device 3 predicts the absence region 45C at the time (t+mΔt) to be able to display the absence region 45C. The time (t+mΔt) is the time later than the time t and time (t+Δt) at which the absence region information is created, and is the time at which the displaying in step S74 is performed. Thus, when the displaying is performed in step S74, the absence region at the time can be displayed (in real time).

(2B) The vehicle-mounted device 3 predicts the absence region 45C at the time (t+mΔt) to perform vehicle control by using the absence region 45C. As a result, the vehicle control can be performed by using the absence region 45C at the time (in real time).

(Other Embodiments)

While the embodiments of the present disclosure have been described, the present disclosure is not limited to the aforementioned embodiments but can adopt various forms.

(1) The following configuration may be adopted as the configuration pertaining to displaying of the absence region (step S53) and vehicle control (step S54) in the first embodiment.

The absence region information created by the transmitter 5 includes positional accuracy information of the transmitter 5. The positional accuracy information of the transmitter 5 indicates magnitude of a positional variation of the transmitter 5. Specifically, the positional accuracy information of the transmitter 5 indicates positional accuracy of the transmitter 5 by magnitude of a range X that is set such that a probability of the transmitter 5 being present within the range X is equal to a predetermined value P (such as 99%). The position of the absence region determined by the transmitter 5 is fixed with respect to the position of the transmitter 5. Therefore, the positional accuracy information of the transmitter 5 indicates positional accuracy of the absence region.

The local absence region information created by the vehicle-mounted device 3 also includes positional accuracy information of the vehicle-mounted device 3. The positional accuracy information of the vehicle-mounted device 3 indicates magnitude of a positional variation of the vehicle-mounted device 3. The positional accuracy information of the vehicle-mounted device 3 is indicated by the magnitude of the range X as well. The position of the local absence region determined by the vehicle-mounted device 3 is fixed with respect to the position of the vehicle-mounted device 3. Therefore, the positional accuracy information of the vehicle-mounted device 3 indicates positional accuracy of the local absence region.

Figure 15:
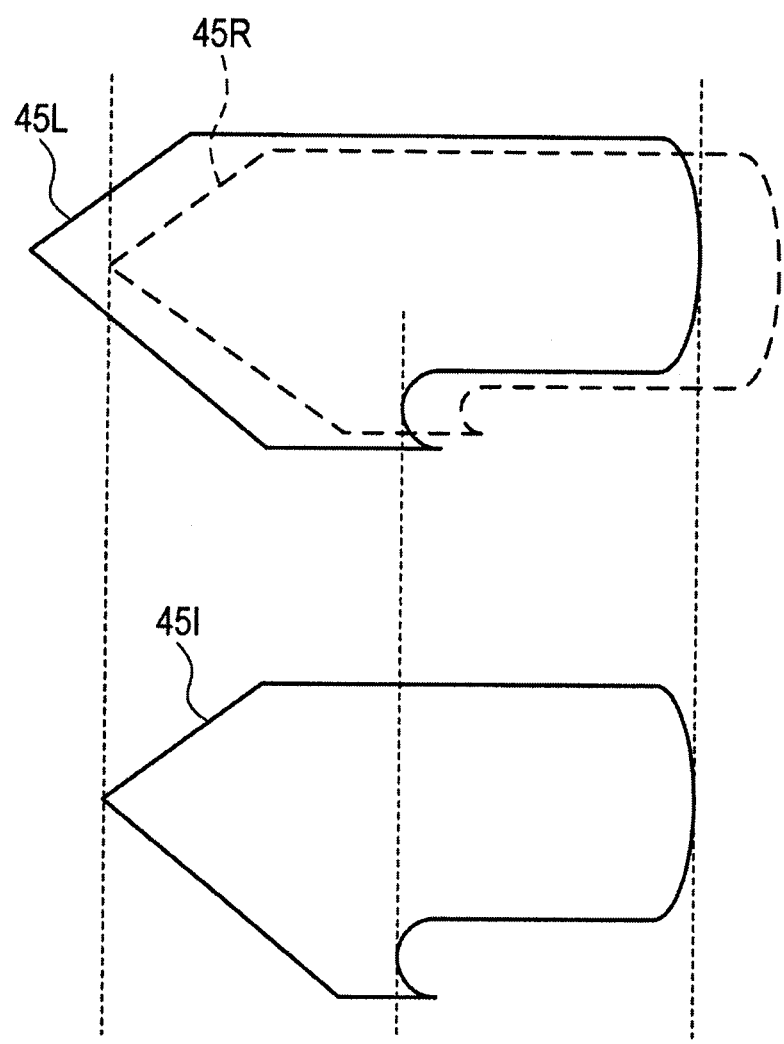
FIG. 15 is a diagram illustrating a method of creating an absence region by using positional accuracy information included in the absence region information.

When performing display on the display 21 in step S53, the display unit 9 selects and displays an area, where a probability of the selected area being an absence region is equal to or more than a predetermined threshold, in the absence region on the basis of positional accuracy. The processing will be specifically described with reference to FIG. 15.

The display unit 9 reads the positional accuracy information included in the absence region information. Note that the positional accuracy is indicated by the magnitude of the range X as described above. The display unit 9 then calculates each of an absence region 45L obtained on the assumption that the transmitter 5 or the like transmitting the absence region information is positioned at one edge of the range X, and an absence region 45R obtained on the assumption that the transmitter 5 or the like is positioned at an opposite edge of the range X.

Next, the display unit 9 calculates an absence region 45I common to the absence region 45L and the absence region 45R. The absence region 45I is a set of points, where a probability being positioned within the absence region is equal to or more than P% (or an area with a probability thereof being the absence region is equal to or more than a predetermined threshold). The display unit 9 displays the absence region 45I on the display 21.

In step S54, the vehicle control unit 15 performs vehicle control on the basis of the absence region 45I and the local absence region 47.

(2) In the first and second embodiments, the vehicle-mounted device 3 and the transmitter 5 may acquire the position information by another method. The strength of a radio wave received by the vehicle-mounted device 3 and the transmitter 5 from a base station reflects the positions of the vehicle-mounted device 3 and the transmitter 5, for example, so that the position information may be acquired on the basis of the received strength. Alternatively, the position information may be acquired by checking the results detected by the sensors 17 and 29 against a database and identifying the positions of the vehicle-mounted device 3 and the transmitter 5. The database refers to one in which the results detected by the sensors 17 and 29 are associated with the position information and stored in advance.

(3) In the first and second embodiments, the vehicle-mounted device 3 may be adapted to not create the local absence region information nor display the local absence region. The vehicle-mounted device 3 may also be adapted to not transmit the local absence region information.

(4) In the first and second embodiments, the transmitter 5 may include a configuration similar to that of the vehicle-mounted device 3 to be able to execute processing similar to that executed by the vehicle-mounted device 3.

(5) The vehicle-mounted device 3 may be adapted to not display the absence region. The vehicle-mounted device 3 may also be adapted to not perform vehicle control.

(6) In the first and second embodiments where the future position of the obstacle is estimated by the second processing, the type of the obstacle may be identified by using map information. That is, the map information stores the position in association with the obstacle, so that the estimated future position of the obstacle can be applied to the map information to be able to identify the type of the obstacle.

(7) In the first and second embodiments, the absence region information transmitted by the transmitter 5 may include an absence region expressed in absolute coordinates. The transmitter 5 uses the position information to be able to express the absence region in absolute coordinates.

Likewise, the local absence region information transmitted by the vehicle-mounted device 3 may include a local absence region expressed in absolute coordinates. The vehicle-mounted device 3 uses the position information to be able to express the local absence region in absolute coordinates.

(8) In the aforementioned embodiments, the function included in a single component may be distributed among a plurality of components, while the functions included in a plurality of components may be integrated into a single component. Moreover, at least a part of the configuration in the aforementioned embodiment may be replaced with a known configuration having a similar function. A part of the configuration in the aforementioned embodiment may be omitted as well. Furthermore, at least a part of the configuration in the aforementioned embodiment may be added to or replaced with the configuration in another one of the aforementioned embodiments.

(9) In addition to the vehicle-mounted device 3 and the transmitter 5, the present disclosure can be implemented by various forms such as a system including the vehicle-mounted device 3 as a component, a system including the transmitter 5 as a component, a program causing a computer to function as the vehicle-mounted device 3, a medium recording the program, a program causing a computer to function as the control unit 27, a medium recording the program, a display method, and a vehicle control method.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display device comprising:
a computer configured to:
communicate with an outside to acquire absence region information identifying an absence region in which an obstacle is presumed to be absent;
display on a display the absence region, which is acquired by the computer, in a state of superimposing the absence region on a map; and
estimate a future position of the obstacle based on a shape of the absence region and a change in the shape of the absence region;
wherein the computer further displays on the display the future position of the obstacle estimated by the computer, and
wherein the shape of the absence region identified by the absence region information is determined based on a detection range of a sensor and a detection result of the sensor.

2. The display device according to claim 1, wherein:
the absence region information includes a positional accuracy of the absence region; and
the display displays an area, where a probability of the area being the absence region is equal to or higher than a threshold value, in the absence region based on the positional accuracy.

3. The display device according to claim 1, the computer being further configured to:
predict the absence region subsequent to a moment at which the absence region information is created, based on a positional change of the absence region as time elapses,
wherein the display displays the absence region predicted by the computer.

4. The display device according to claim 1, the computer being further configured to:
estimate the future position of the display device,
wherein the display further displays the estimated future position of the display device.

5. A vehicle controller comprising:
a computer configured to:
communicate with an outside to acquire absence region information identifying an absence region in which an obstacle is presumed to be absent;
perform vehicle control based on the absence region acquired by the computer; and
estimate a future position of the obstacle based on a shape of the absence region and a change in the shape of the absence region;
wherein the computer performs the vehicle control based on the future position of the obstacle estimated by the computer; and
wherein the shape of the absence region identified by the absence region information is determined based on a detection range of a sensor and a detection result of the sensor.

6. The vehicle controller according to claim 5, wherein:
the absence region information includes a positional accuracy of the absence region; and
the computer is further configured to select an area, where a probability of the area being the absence region is equal to or higher than a threshold value, in the absent region, based on the positional accuracy, and uses the area in the vehicle control.

7. The vehicle controller according to claim 5, the computer being further configured to:
predict the absence region subsequent to a moment at which the absence region information is created based on a positional change of the absence region as time elapses,
wherein the computer is further configured to use the absence region predicted in the vehicle control.

8. The vehicle controller according to claim 5, the computer being further configured to:
estimate the future position of the vehicle controller,
wherein the computer is configured to use the future position of the vehicle controller estimated in the vehicle control.

9. A travelling assistance system comprising:
a display device that includes a first computer configured to:
communicate with an outside to acquire absence region information identifying an absence region in which an obstacle is presumed to be absent,
display the absence region on a display, which is acquired by the first computer, in a state of superimposing the absence region on a map, and
estimate a future position of the obstacle based on a shape of the absence region and a change in the shape of the absence region; and a transmitter that includes:
  a sensor that detects the obstacle, and
  a second computer configured to create the absence region information indicative of a shape of the absence region in which the obstacle is presumed to be absent based on a result detected by the sensor and based on a detection range of the sensor, and transmit the absence region information, wherein:
the first computer further displays on the display the future position of the obstacle estimated by the first computer; and
the shape of the absence region identified by the absence region information is determined based on a detection range of a sensor and a detection result of the sensor.

10. A travelling assistance system comprising:
a vehicle controller that includes a first computer configured to:
  communicate with an outside to acquire absence region information identifying an absence region in which an obstacle is presumed to be absent,
  perform vehicle control based on the absence region acquired by the first computer, and
  estimate a future position of the obstacle based on a shape of the absence region and a change in the shape of the absence region; and
a transmitter that includes:
  a sensor that detects the obstacle, and
  a second computer configured to create the absence region information, which specifies a shape of the absence region in which the obstacle is presumed to be absent based on a result detected by the sensor and based on a detection range of the sensor and transmit the absence region information, wherein:
the first computer performs the vehicle control based on the future position of the obstacle estimated by the first computer; and
the shape of the absence region identified by the absence region information is determined based on a detection range of a sensor and a detection result of the sensor.

11. The travelling assistance system according to claim 9, wherein the absence region information includes a timestamp and the timestamp indicates a time at which sensing is performed by the sensor.

12. The display device according to claim 1,
wherein the absence region is expressed in one or more coordinate points relative to a position of the sensor.

13. The display device according to claim 12,
wherein the absence region includes all of the one or more coordinate points from the sensor up to a detection limit line of the detection range, in response to the sensor not detecting the obstacle.

14. The display device according to claim 12,
wherein one part of the one or more coordinate points, which is from the sensor up to the obstacle along a direction viewed from the position of the sensor to the obstacle, is included in the absence region, in response to the sensor detecting the obstacle.

15. The display device according to claim 14,
wherein another part of the one or more coordinate points, which is at a position of the obstacle and farther from the position of the obstacle along the direction as viewed from the position of the sensor to the obstacle, is not included in the absence region, in response to the sensor detecting the obstacle.

16. The display device according to claim 1,
wherein the computer is further configured to:
  obtain subsequent absence region information at a time point later than obtaining the absence region information; and
  estimate the future position of the obstacle based the shape of the absence region and a shape of a subsequent absence region, which is identified by the subsequent absence region information.

* * * * *